United States Patent [19]

Crankshaw et al.

[11] 4,378,665
[45] * Apr. 5, 1983

[54] MACHINE FOR ORIENTING AN ARTICLE AND PERFORMING A WORK OPERATION ON THE ARTICLE

[75] Inventors: Michael Crankshaw, Santa Fe Springs; Leo Kucheck, Irvine, both of Calif.

[73] Assignee: Label-Aire Inc., Fullerton, Calif.

[*] Notice: The portion of the term of this patent subsequent to May 6, 1997, has been disclaimed.

[21] Appl. No.: 134,572

[22] Filed: Mar. 27, 1980

Related U.S. Application Data

[63] Continuation-in-part of Ser. No. 930,720, Aug. 3, 1978, Pat. No. 4,201,621.

[51] Int. Cl.³ .............................................. B65G 29/00
[52] U.S. Cl. .................................... 53/69; 53/276; 198/481; 198/723
[58] Field of Search ............... 198/345, 344, 481, 480, 198/394, 723, 655; 53/69, 279, 276, 266 R

[56] References Cited

U.S. PATENT DOCUMENTS

| | | | |
|---|---|---|---|
| 1,957,534 | 5/1934 | Gladfelter | 198/481 |
| 2,436,820 | 3/1948 | Nordquist et al. | 198/345 X |
| 2,620,058 | 12/1952 | Smith et al. | 198/481 |
| 2,756,862 | 7/1956 | Creed | 198/481 |
| 3,064,714 | 11/1962 | Flood | 156/567 X |
| 3,272,309 | 9/1966 | Reading | 198/723 X |
| 3,556,279 | 1/1971 | Cotter | 198/481 X |
| 3,687,261 | 8/1972 | Guckel | 198/481 X |
| 4,201,621 | 5/1980 | Crankshaw et al. | 156/567 |
| 4,203,798 | 5/1980 | Yamashita | 156/567 |

Primary Examiner—James F. Coan
Attorney, Agent, or Firm—Gordon L. Peterson

[57] ABSTRACT

An apparatus which grips an article on the opposite sides of the article to hold the article in a predetermined orientation. One or more work operations are performed on the article while it is held in the predetermined orientation. The article is gripped between a movable resilient member and a guide which holds the article against the movable resilient member.

22 Claims, 11 Drawing Figures

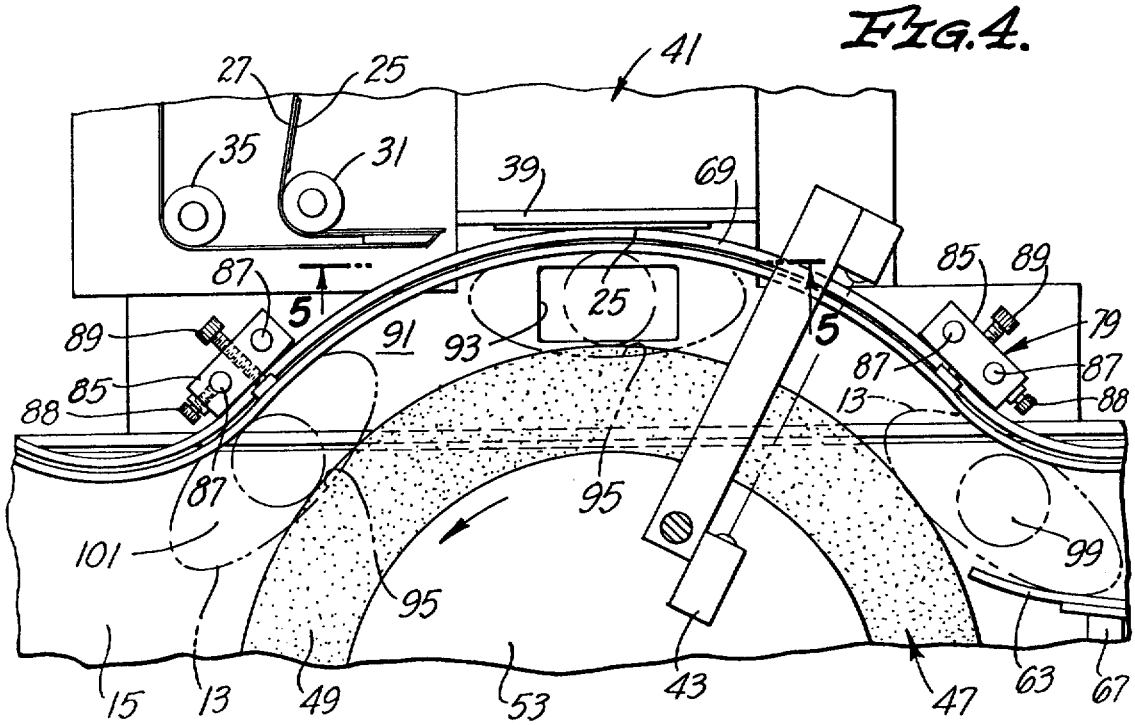
FIG.4.
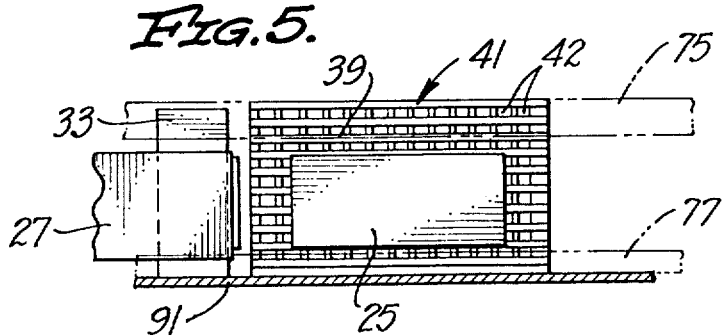
FIG.5.
FIG.6.

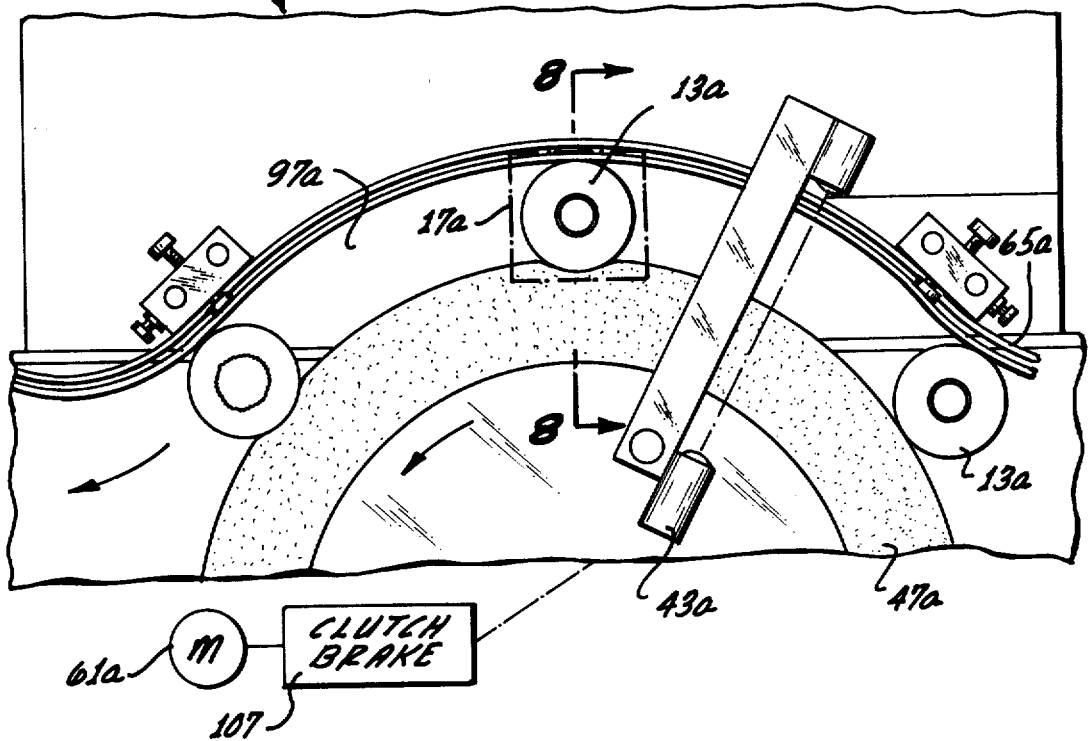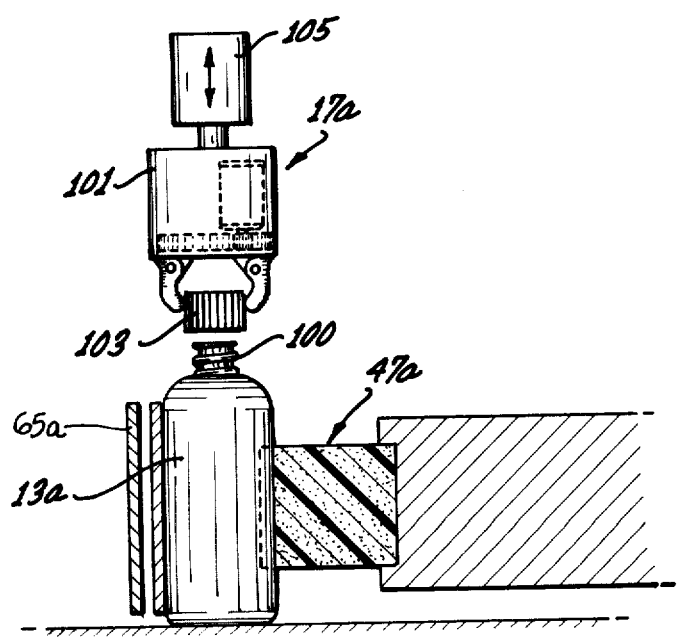

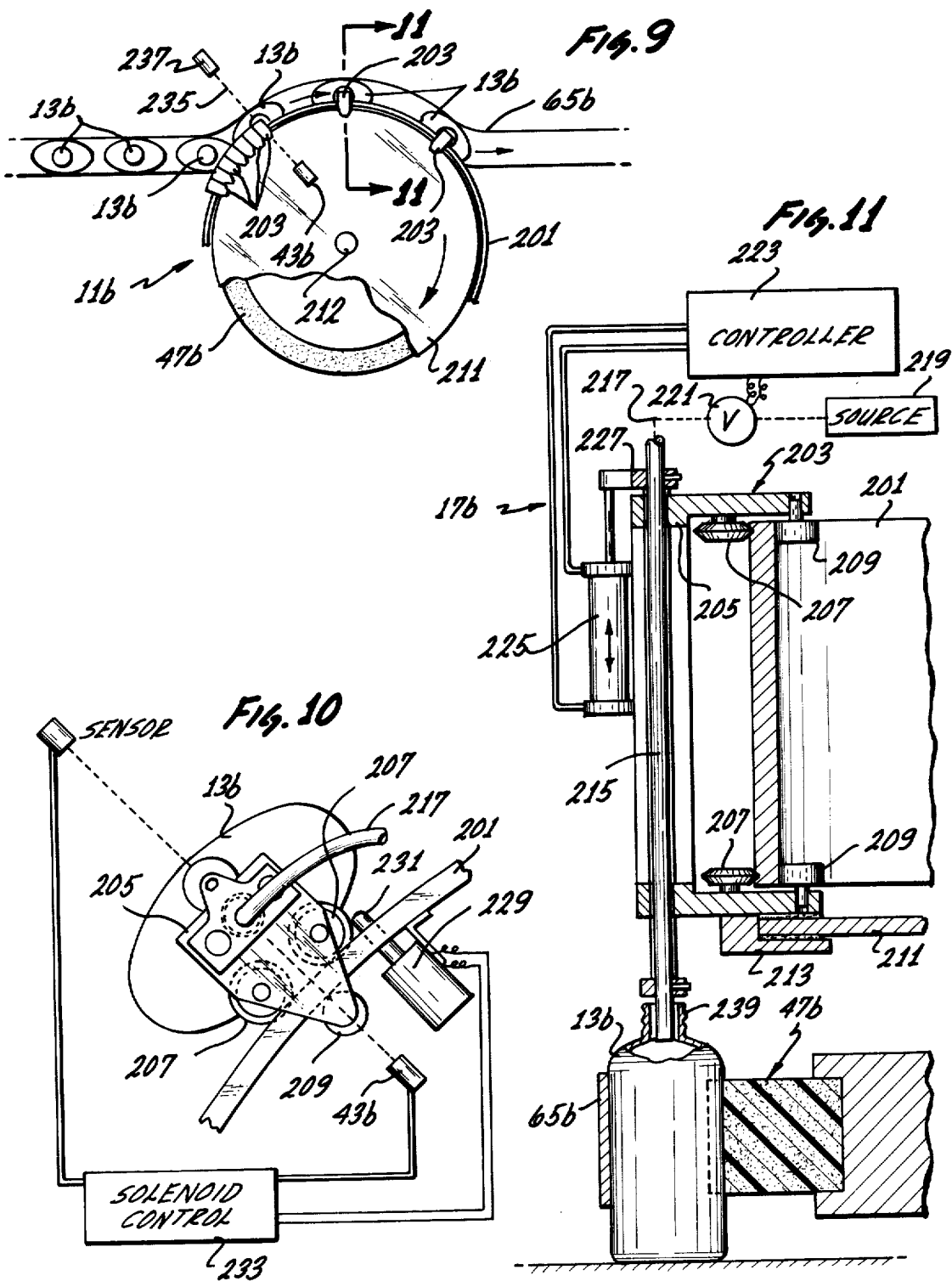

MACHINE FOR ORIENTING AN ARTICLE AND PERFORMING A WORK OPERATION ON THE ARTICLE

BACKGROUND OF THE INVENTION

This application is a continuation-in-part of Application Ser. No. 930,720 filed Aug. 3, 1978 now U.S. Pat. No. 4,201,621, and entitled label applicator for irregularly shaped articles.

In labeling some articles, it is necessary to grip the articles and accurately hold them in a predetermined orientation. This is necessary, for example, in labeling articles, such as bottles, of an irregular configuration with labels which must be accurately oriented on the article.

One prior art way of accomplishing this labeling function is to guide the article into a lead screw with the lead screw rotating at a speed to advance the article at approximately the same rate as the article conveyor. With this arrangement, the article is retained between the threads of the lead screw by a guide. A top hold-down belt holds the article downwardly against the conveyor.

A primary problem with this prior art construction is that a different setup is required for each different size article to be labeled. For example, the lead screw must be changed each time an article of a different length is to be labeled, and the height of the hold-down belt must be adjusted each time articles of different height are to be labeled. These changes take time to accomplish and increase the downtime of the labeling line, as well as requiring additional capital outlay and storage space for the different sizes of screws that are necessary.

This prior art construction has other disadvantages. For example, if the article is a bottle with a cap and the cap is inadvertently left off, the top hold-down belt cannot perform its article capturing function due to the reduced overall height of the article as a result of the absence of the cap. In addition, the loading of articles into the screw requires some special consideration, such as a special input device or a jam input. Finally, with the article held by the lead screw, it is sometimes difficult to provide sufficient room while the article is captured to carry out the labeling function.

Other work operations also require that the article on which the work operation is to be performed be properly oriented during the time that the work operation is being carried out. For example, in an automated container filling apparatus, it is necessary to orient the open top of the container relative to the filler arm. Similarly, in an automated container capping operation, it is necessary to accurately orient the closure which is to be applied relative to the portion of the container which is to receive the closure. In these and other work operations, it is desirable to carry out the work operation on articles which are randomly spaced. This has not always been possible with prior art units in that prior art devices typically require fixed, known spacing between articles as the articles are moved through a work station.

SUMMARY OF THE INVENTION

This invention solves the problems noted above. This invention provides an apparatus for orienting articles which are moved along a path so that a work operation may be performed on the articles while the articles are oriented. The work operation may be of virtually any kind and may be, for example, container filling, container capping, labeling, a drilling or machine operation, etc.

The apparatus orients articles even though the articles supplied to it have random spacing. In addition, the articles oriented by the orienting apparatus can have random or variable spacing without adversely affecting the work operation in that the work operation is "slaved" to the frequency with which articles are moved through the work station.

The orienting apparatus is very versatile and is particularly adapted for orienting articles of different sizes and configurations without requiring significant changes in the mechanism for holding the articles in a predetermined orientation. Variations in height of the article do not affect the ability of the mechanism to capture and retain articles in a predetermined orientation.

As applied to label applicators, this invention eliminates the lead screw of the prior art. In addition, the need for the hold-down belt is eliminated; however, the hold-down belt can be used, if desired.

With this invention, the article gripping means includes first means for engaging the article on at least one side thereof. The first means has a resilient, deformable surface and is mounted for movement. The article gripping means also includes means cooperating with the first means for engaging the articles on at least the other side thereof to urge the articles against the resilient deformable surface. This urges the articles against the resilient, deformable surface to deform the latter. Consequently, pockets are formed in the deformable surface which generally conform to the shape of the article and the cooperating means holds the articles in these pockets. This securely holds the articles in a predetermined orientation so that a work operation can be performed on the articles while they are held in the predetermined orientation. This assures that the work operation will be accurately carried out on the articles. In addition, the deformable surface is adapted to accommodate articles having random spacing.

Because the resilient, deformable surface can effectively take the configuration of the article to be labeled, reasonable variations in this configuration do not require any set-up change. Because the articles can be retained in a predetermined orientation by gripping them on the opposite sides, the hold-down belt of certain prior art label applicators is not required. Consequently, variations in height of the articles do not require a change in setup. For major changes in width of the articles, the spacing between the first means and the cooperating means can be quickly and easily adjusted.

Typically, the articles on which a work operation is to be performed are moved past the apparatus for performing the work operation on a conveyor. With this invention, the article gripping means can take the articles off of the conveyor while they are held in the predetermined orientation or leave them on the conveyor while they are held in the predetermined orientation. One advantage of taking the articles off of the conveyor is that a work operation, such as labeling, can be performed on the bottom of the articles. In addition, more accuracy can be obtained with the articles off line.

Although the first means may take different forms, in a preferred embodiment, it includes a rotatable wheel having a peripheral surface which is resiliently deformable and which is engageable with one side of the article. The resilience of the peripheral surface can be brought about in different ways, such as by constructing the wheel or a portion thereof of resilient material, by using an inflatable bladder for all or a portion of the wheel, etc. Alternatively, a soft belt or one which can be resiliently deformed inwardly can be used. In any event, the peripheral surface can deform to take on the configuration of the article pushed against it.

The wheel is preferably mounted for rotation about a rotational axis which extends generally transverse to the direction of movement of the conveyor adjacent the wheel. The wheel lies at least partially in the path of articles conveyed to the wheel by the conveyor. With the articles being moved horizontally past the label applicator, the rotational axis of the wheel is preferably generally vertical, although other orientations of this axis which would permit the peripheral surface of the wheel to grip a side of the article to be labeled can be employed.

The cooperating means can be any means which urges the articles against the peripheral surface of the wheel. For example, the cooperating means may include a guide for directing the articles appropriately against the wheel and holding the articles against the wheel for a predetermined length of travel of the articles. For example, the guide may include one or more stationary rails, at least a portion of which has a shape complementary to the shape of the peripheral surface of the wheel. Both the peripheral surface of the wheel and the guide may be similarly curved.

To take the articles off the conveyor utilizing the wheel, preferably the wheel is placed in the path of the articles on the conveyor with a portion of the peripheral surface being displaced horizontally from the conveyor. The guide is appropriately shaped to guide the articles on the conveyor against the peripheral surface and then forwardly in the direction of conveyor movement and laterally off of the conveyor generally following the contour of the peripheral surface. If desired, a platform can be provided adjacent the conveyor at the location where the articles are moved laterally off of the conveyor so that the articles can be moved over the platform. To permit a work operation to be performed on the bottoms of the articles, the platform should have aperture means so that the article bottom is accessible through the aperture means.

Although for some applications, it may be possible to rotate the wheel using power from the conveyor applied through the article to be labeled, it is preferred to provide motor means for rotating the wheel because this enables removal of the articles from the conveyor. In addition, by driving the wheel, and hence the article, at a known speed and sensing the article after it is captured, the work operation can be performed at a very accurately known locations on the article. Also, the work operation is performed as demanded by the rate at which the articles are fed through the work station, and the articles captured by the wheel may be unequally or randomly spaced.

Another feature of this invention is that a work operation can be performed on randomly spaced moving articles as such randomly spaced moving articles pass through a work station. This concept can be used, for example, in a container filling machine so that randomly spaced containers can be continuously filled as they move through the work station.

This can be accomplished, for example, by using a plurality of assemblies for performing a work operation on the articles at the work station and means for mounting the assemblies for moving along an endless path. The articles to be worked upon are gripped or oriented as they are moved through the work station with random spacing. Sensing means is responsive to each of the articles reaching a predetermined location for providing a signal. Control means is responsive to each of the signals for causing one of the assemblies to move along the endless path at the work station with an associated one of the articles and to perform a work operation on such article.

The invention, together with further features and advantages thereof, may best be understood by reference to the following description taken in connection with the accompanying illustrative drawings.

BRIEF DESCRIPTION OF THE DRAWING

FIG. 4 is an enlarged top plan view of a portion of the construction shown in FIG. 1.

FIG. 5 is an elevational view taken generally along line 5—5 of FIG. 4 with the upper and lower rails being shown in phantom lines.

FIG. 6 is an enlarged side elevational view of one of the mounts for the guides.

FIG. 7 is an enlarged fragmentary plan view similar to FIG. 4 illustrating a second embodiment of the invention.

FIG. 8 is a fragmentary sectional view taken generally along line 8—8 of FIG. 7.

FIG. 9 is a fragmentary plan view with parts broken away of a third embodiment of the invention.

FIG. 10 is an enlarged fragmentary plan view in partially schematic form illustrating one of the filler assemblies and associated components of the apparatus.

FIG. 11 is an enlarged fragmentary sectional view taken generally along line 11—11 of FIG. 9 with portions being shown schematically.

DESCRIPTION OF THE PREFERRED EMBODIMENT

Figure 1:
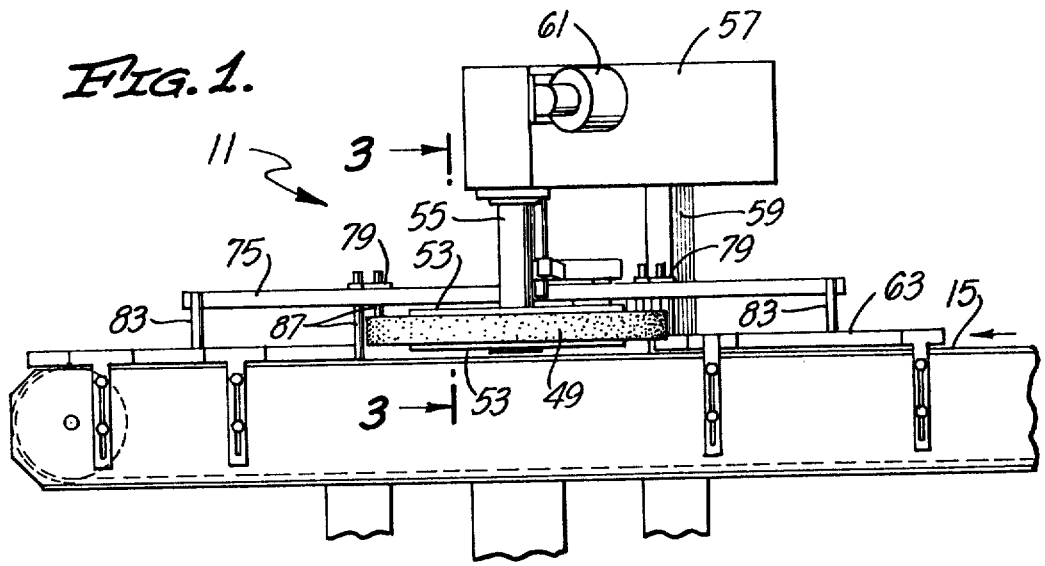
FIG. 1 is a fragmentary side elevational view of a label applicator constructed in accordance with the teachings of this invention and installed adjacent to a conveyor line for labeling the articles on such line.
Figure 2:
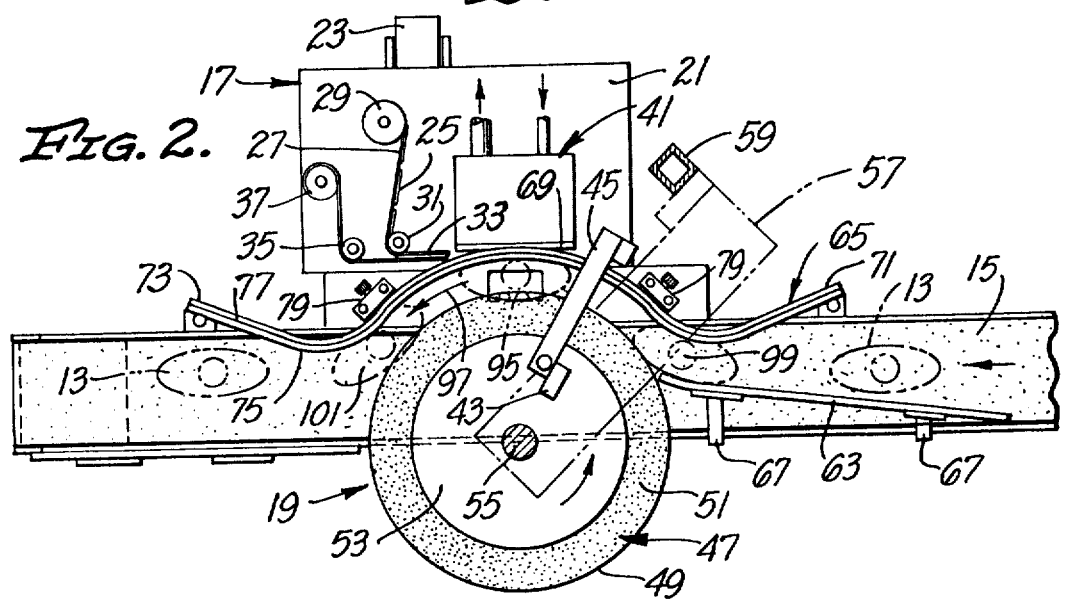
FIG. 2 is a top plan view of the construction shown in FIG. 1.
Figure 3:
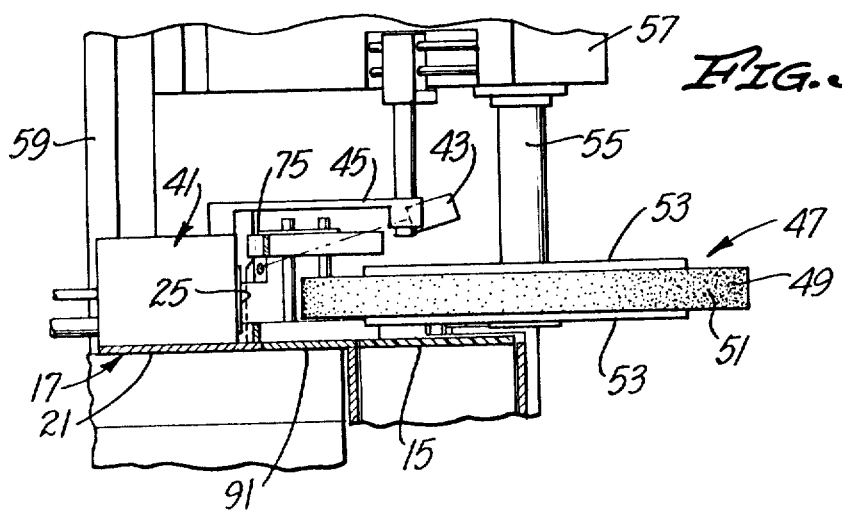
FIG. 3 is an enlarged fragmentary sectional view taken generally along line 3—3 of FIG. 1.

FIGS. 1 and 2 show a label applicator 11 for applying labels to articles 13 (FIG. 2) which are moved along a horizontal path past the label applicator 11 by any suitable means, such as a conveyor 15. The label applicator of this invention is particularly adapted for labeling articles of elliptical, tapered or other irregular configurations; however, it can also be used for labeling articles of more conventional configuration. Generally, the label applicator 11 includes labeling means 17 and article capturing means 19.

The labeling means 17 may be of conventional construction and, for this reason, is not described in detail herein. Briefly, the labeling means 17 includes a supporting structure 21 mounted on a suitable support, such as a vertical post 23 so that its height may be adjusted. The post 23 may, in turn, be mounted on a movable carriage (not shown) to permit the labeling means 17 to be moved horizontally.

Although the labeling means 17 may use various different kinds of label feeds, in the embodiment illustrated, labels 25 are releasably adhered to an elongated backing strip or web 27 by a pressure sensitive adhesive. The web 27 is wound on a supply reel 29 and passes over a plurality of rollers 31 (only one being shown in FIG. 2) to a peeling bar 33 and then over one or more additional rollers 35 to a take-up reel 37. In passing over the peeling bar 33, the web 27 is folded into a reverse bend, and the label 25 is separated from the web.

A label 25 removed from the web 27 is releasably retained at a labeling station. Although this function can be provided for in different ways, in the embodiment illustrated, the removed label is releasably retained in a well-known manner against an air previous grid 39 by sub-atmospheric pressure within a vacuum box 41. In the embodiment illustrated, the grid 39 lies in a vertical plane and has openings 42 (FIG. 5). The label 25 is retained on the grid until one of the articles 13 is properly positioned with respect thereto, and at this instant, the label is transferred from the grid 39 to such article with the adhesive on the label adhering it to the article. Although this transfer function can be accomplished in different ways, in the embodiment illustrated, a blast of air under pressure is supplied to the vacuum box 41 and through the openings 42 to blow the label 25 onto the article 13 adjacent the grid 39.

The labeling means 17 can be controlled in a known manner. As shown in FIG. 2, a product sensor 43 is carried by an arm 45 of the supporting structure 21 and provides a signal each time the leading edge of one of the articles 13 approaches the grid 39. Thereafter, the labeling means 17 is appropriately timed in a known manner to apply the label to the article 13 when it reaches an appropriate position immediately adjacent the grid 39.

The article capturing means 19 includes a wheel 47 having a cylindrical peripheral surface 49. Although the wheel 47 may be of different constructions, in the embodiment illustrated, it includes a resiliently deformable cylindrical disc 51 of foam plastic material sandwiched between a pair of circular cover plates 53. The disc 51 is of larger diameter than the plates 53 and so an annular region of the disc projects radially outwardly beyond the plates 53.

The wheel 47 is mounted for rotation about a vertical rotational axis by a shaft 55 which in turn is rotatably mounted on an arm 57. The arm 57 is in turn suitably mounted on a post 59 so that the elevation of the wheel 47 can be adjusted. The post 59 can be mounted on a suitable carriage (not shown) to permit the horizontal position of the wheel 47 to be adjusted. A motor 61 rotates the shaft 55 and the wheel 47.

To control movement of the articles 13 on the conveyor 15 near the wheel 47, guides 63 and 65 are employed. The guide 63 is a lead-in guide and it extends along the surface of the conveyor 15 from the edge of the conveyor remote from the grid 39 generally toward the opposite edge of the conveyor at an appropriate incline so as to gradually guide the article 13 against the peripheral surface 49. The guide 63 may be fixedly mounted as by supports 67 mounted adjacent the conveyor 15 or on the usual fixed portions of the conveyor.

The guide 65 includes a central section 69 which is curved to form a portion of a circle concentric with the cylindrical peripheral surface 49 and opposite end sections 71 and 73 which are inclined away from the conveyor 15. Although the guide 65 may be of various different constructions, it preferably includes an upper rail 75 and a lower rail 77 (FIGS. 5 and 6) which are spaced apart sufficiently to provide aperture means which permit the label on the grid 39 to be passed between such space in being transferred from the grid to the adjacent one of the articles 13. Each of the rails 75 and 77 is an elongated, flexible resilient strip.

Both of the rails 75 and 77 are mounted on identical mounts 79, and the opposite end portions of the rails 75 and 77 are held away from the conveyor 15 by fixed vertical rods 83. Each of the mounts 79 includes an upper block 85 and a lower block 86 mounted on a pair of vertical rods 87. The block 86 can be suitably fixed at the lower ends of the rods 87, and the block 85 is mounted for vertical sliding movement on the rods 87. The position of the block 85 along the rods can be adjusted by a set screw 88. A screw 89 is threaded into and carried by the block 85, and the upper rail 75 is suitably mounted on the inner end of the screw by a bearing 84 which permits the screw to turn relative to the upper rail. Accordingly, the screw 89 can be used to move the upper rail toward and away from the wheel 47 so that the guide 65 can be used for articles which have tapered side walls. The lower rail 77 is suitably affixed to the lower block 86. Of course, the specific construction of the guide 65, although preferred, is merely illustrative of one form of device which can be utilized for cooperating with the wheel 47 to hold the articles snugly against the peripheral surface 49.

The wheel 47 and the guide 65 cooperate to move the articles 13 laterally off of the conveyor 15 to a labeling station closely adjacent the grid 39. A horizontal plate 91 is provided between the conveyor 15 and the grid 39 at approximately the same elevation as the conveyor to support the articles 13 when they are removed from the conveyor. The plate 91 has an aperture 93 extending completely through it to permit labels to be applied to the bottoms of the articles 13 by another labeling means (not shown). The plate 91 can be supported in various different ways and, in the embodiment illustrated, it is mounted on the supporting structure 21.

With the components of the label applicator 11 arranged as shown in the drawing, the curved central region 69 of the guide 65 is centered on the grid 39 and is closely adjacent the grid. In the embodiment illustrated, the wheel 47 is mounted so that a radial line through the wheel 47 can be drawn perpendicular to the plane of the grid 39. The conveyor 15 moves the articles 13 horizontally past the label applicator 11 from right to left as viewed in FIG. 2. The peeling bar 33 is located at the downstream edge of the grid 39. The wheel 47 is sized and positioned so that a portion of the peripheral surface 49 is horizontally displaced from the conveyor 15.

In use, the guide 63 guides the articles 13 on the conveyor 15 against the peripheral surface 49 of the wheel 47 and against the central section 69 of the guide 65. This urges the article 13 against the resiliently deformable peripheral surface 49 to deform the wheel 47 radially inwardly to define a pocket 95 in which a portion of one side of the article 13 is received. In this manner, the article is captured and held in a predetermined orientation between the wheel 47 and the guide 65.

The wheel 47 rotates counterclockwise as viewed in FIG. 2 to move the articles 13 in the same general direction as the direction of movement of the conveyor 15. The articles 13 are captured between the wheel 47 and the guide 65 and are moved along an arcuate path 97 generally conforming to the configuration of the central section 69 from an inlet 99 to an outlet 101. This moves the articles 13 laterally off of the conveyor 15 and toward the grid 39. The approaching article 13 is sensed by the product sensor 43 which signals the labeling means 17 to dispense a label at the instant at which such article is directly confronting and centered on the grid 39. Because the article is captured, its orientation relative to the label on the grid is accurately known and controlled. Thereafter, the guide 65 and the wheel 47 cooperate to return the labeled article 13 to the conveyor 15.

The motor 61 rotates the wheel 47 at a known velocity so that the timing of the labeling function by the labeling means 17 is easily and accurately carried out. The wheel 47 can be driven at any speed compatible with the labeling means 17. If the articles 13 are temporarily supplied by the conveyor 15 faster than they can be labeled, they merely stack up adjacent the inlet 99 to the path 97, and there is no need to shut down the conveyor.

The labeling means 17 can label one side and the bottom of the articles 13. If it is desired to label the other side of the articles 13, another label applicator identical to the label applicator 11 is provided along the conveyor 15. The only difference is that this second label applicator would be located on the opposite side of the conveyor, i.e., it would be rotated 180 degrees, and the wheel 47 is appropriately positioned to allow labeling of the other side of the articles 13.

FIGS. 7 and 8 illustrate how the invention can be embodied in a capping apparatus 11a. Portions of the embodiment of FIGS. 7 and 8 corresponding to portions of the embodiment of FIGS. 1-6 are designated by corresponding reference numerals followed by the letter "a". The capping apparatus 11a may be identical to the label applicator 11 in all respects not shown or described herein.

The primary differences between the capping apparatus 11a and the label applicator 11 is that the former utilizes capping means 17a in lieu of the labeling means 17 and the wheel 47a stops when it begins an article 13a into position to be capped. In addition, for illustrative purposes, the articles 13a are illustrated as being generally cylindrical, and, therefore, depending upon the diameter of the articles in relationship to the space between the guide 65a and the periphery of the wheel 47a, the articles may roll as they move along the path 97a. As best shown in FIG. 8, each of the articles 13a has an externally threaded neck 100 on which the cap 103 is to be screwed.

The capping means 17a may be of conventional construction and is illustrated diagrammatically and by way of example as including a cap applying head 101 (FIG. 8) for rotating a cap 103 to be applied to one of the articles 13a and a vertical feed mechanism 105 for moving the head 101 vertically. The caps 103 can be supplied to the head 101 manually or automatically in accordance with known techniques, and the head 101 and the feed mechanism 105 can also be controlled in a conventional manner.

The wheel 47a is driven by a motor 61a, either directly or through a clutch and brake 107. The clutch is disengaged and the brake is engaged whenever one of the articles 13a is positioned directly beneath the head 101. This can be brought about, for example, by employing a time delay mechanism which will allow the wheel 47a to rotate a known amount after a signal from the sensor 43a is obtained.

In use, the articles 13a are captured and oriented between the guide 65a and the wheel 47a. When one of the captured and oriented articles is detected by the sensor 43a, a signal is provided that is used to discontinue rotation of the wheel 47a when the article 13a is immediately below the head 101 and to initiate operation of the conventional capping means 17a after such article 13a is stopped below the head 101. Of course, the articles 13a can be randomly fed to the path 97a and they may be moved along the path 97a with random spacing existing between such articles.

FIGS. 9-11 show how the invention can be embodied in an apparatus which performs a work operation on articles 13b which are moved through a work station with random spacing. Portions of the apparatus 11b corresponding to portions of the label applicator 11 are designated by corresponding reference numerals followed by the letter "b." The apparatus 11b is identical to the label applicator 11 in all respects now shown or described herein.

The primary difference between the apparatus 11b and the label applicator 11 is that the former utilizes a filling means 17b in lieu of the labeling means 17. Many different forms of bottle filling equipment are known, and in a broader sense, the filling means applicable to this form of the invention may be of any suitable construction which permits the filling operation to be slaved to the frequency with which the articles 13b are supplied to the filling means 17b for filling. This enables the apparatus 11b to fill articles 13b in the form of containers which are supplied to it with random spacing and which are moved through the work station with random spacing.

By way of illustration, the filling means 17b may include a stationary control ring 201 and a plurality of filler assemblies 203 mounted for movement on the control ring. The control ring 201 defines an endless path which, in the embodiment illustrated, is circular. The control ring 201 may be suitably fixedly mounted on suitable supporting structure (not shown).

Each of the filler assemblies includes a body 205 mounted for movement on the control ring by roller bearings 207 and cam follower bearings 209. Thus, the body 205 and the bearings 207 and 209 form a trolley which is freely movable along the circular path defined by the control ring 201.

To drive the filler assemblies 203, a drive disc 211 is coupled directly to the wheel 47b by a shaft 212 (FIG. 9) for rotation with the wheel. The drive disc 211 in the embodiment illustrated is mounted above the wheel 47b and rotates continuously with the wheel at the same angular velocity.

Each of the filler assemblies 203 has a slip coupling 213 which drivingly couples the associated filler assembly to the drive disc 211. When unrestrained, the filler assemblies 203 are drivingly coupled to the drive disc 211 by the associated coupling 213 and rotate with the drive disc but, when restrained, the coupling 213 slips on the drive disc 211.

Each of the filler assemblies 203 includes a filler tube 215 suitably mounted on an associated body 205 for reciprocating movement along a vertical filler tube path. Each of the filler tubes 215 is coupled to a flexible hose 217 which communicates with a source 219 of flowable material, such as a liquid which is to be used to fill each of the articles 13b. A valve 221 in each of the flexible hoses 217 controls the supply of the material from the source 219 to the associated tube 215. The valve 221, in turn, is controlled electrically or pneumatically in a conventional manner by a controller 223. The controller 223 opens the valve 221 to establish flow to the article 13b and closes the valve after a predetermined amount of the material has been deposited in the article.

Each of the filler assemblies 203 includes an actuator, such as a pneumatic actuator 225, for reciprocating the filler tube 215. For example, the pneumatic actuator 225 may be mounted on the body 205 and be coupled by a coupling 227 to the filler tube 215.

The actuator 225 can advantageously be controlled by the controller 223. For example, the same signal from the controller 223 which opens the valve 221 may actuate the actuator 225 to move the filler tube 215 to its down position. Conversely, the same signal which closes the valve 221 may be used to actuate the actuator 225 to move the filler tube 215 to its upper position. Of course, to avoid spilling of the material which is to be deposited in the article 13b, the filler tube 215 should be lowered before opening of the valve 221 and raised after closing of the valve 221, and this can be accomplished, for example, by delaying slightly the response of the valve 221 to the valve opening signal and delaying slightly the response of the actuator 225 to the valve closing signal. Of course, the valve 221 may be located closely adjacent the lower end of the filler tube 215, if desired.

The filler assemblies 203 are held at a starting position (FIG. 10) by a detent which, in the embodiment illustrated, is in the form of a solenoid 229 suitably mounted on the interior of the control ring 201. The solenoid 229 has a plunger 231 which, in the de-energized condition of the solenoid, projects into the path of travel of the filler assemblies 203. For example, the plunger 231 may project into the path of the leading bearings 207. When the solenoid 229 is energized, the plunger 231 retracts to allow the leading one of the filler assemblies 203 to be released to move with the drive disc 211. In FIG. 10, the plunger 231 is in the process of being retracted to release the filler assembly 203 to move with the captured article 13b therebelow.

The solenoid 229 is controlled by the sensor 43b which provides a signal to a solenoid controller 233 when the leading edge of one of the articles 13b crosses a sensing path 235 between a light source 237 and the sensor 43b which, for example, may take the form of a photocell. The solenoid controller 233 energizes the solenoid 229 in a conventional manner a predetermined time following reception of the signal from the sensor 43b. The time delay imposed by the solenoid controller 233 is just sufficient to allow the article 13b to travel to a position in which the neck 239 of the article 13b is positioned in axial alignment with the filler tube 215. As soon as the leading one of the filler assemblies 203 has been released by the solenoid 229, the solenoid controller 233 de-energizes the solenoid 229 whereupon the plunger 231 immediately extends to its outward position to prevent the release of a second one of the filler assemblies 203.

In operation of the apparatus 11b, articles 13b are oriented and captured between the wheel 47b and the guide 65b as described hereinabove. Subsequently, the leading edge of one of the articles 13b comes in line with the sensing path 235 and this results in the release of the leading one of the filler assemblies 203 as described above for movement with the wheel 47b and the associated article 13b.

The signal from the sensor 43b is also fed to the controller 233 which, after a predetermined delay provides a valve opening signal to the actuator 225 whereupon the filler tube 215 is moved downwardly into the neck 239 of the article 13b. The valve opening signal is also provided after a very short delay period to the valve 221 to open the valve, to permit flow of the material from the source 219 through the valve 221 and the filler tube 215 to the article 13b. When the article 13b has been appropriately filled with the material as determined in a conventional manner by the controller 233, the valve closing signal is provided to the valve 221 whereupon the valve closes. This same valve closing signal after a short delay is provided to the actuator 225, and in response, the actuator 225 moves the filler tube 215 upwardly out of the neck 239 of the article 13b. Thereafter, the article 13b is released by the wheel 47b and the guide 65b, and the filler assembly 203 returns to the back of the line of filler assemblies 203 at the starting position. During the time that the filler assemblies 203 are held at the starting position by the solenoid 229, the couplings 213 slip on the drive disc 211. When the next article 13b is sensed by the sensor 43b, the process described above is repeated.

The wheel 47b, the article 13b being filled and the associated filler assembly 203 move together continuously as a unit from the time the solenoid 229 is energized until a time after the filler tube 215 is retracted from the associated article 13b. The controller 223 energizes the valves 221 of the filler assemblies 203 in a repetitive sequence so there is no danger that the wrong valve will be opened. Similarly, the controller 223 energizes the actuators 225 of the filler assemblies 203 in the same repetitive sequence so that the correct one of the actuators 225 is always energized.

As an alternative, the coupling 213 can be a variable torque slip coupling having a positive drive mode in which the coupling is positively locked to the drive disc 211 to provide a "1"-to-"1" drive ratio and a slip mode in which the coupling slips on the drive disc but is driven by the drive disc. With this arrangement, the coupling 213 is in the positive drive mode from the time the associated assembly 203 begins its movement with an associated article until just after the filler tube 215 is raised out of the article at the completion of the filling operation, and the coupling is in the slip mode at all other times. The switching of the coupling 213 between modes can be accomplished in various ways. For example, the controller, which receives the signal from the sensor 43b, can provide a drive signal to the coupling 213 in response to the signal from the sensor, and the valve closing signal discussed above can also be used, after a predetermined delay, to switch the coupling 213 to the slip mode.

Although exemplary embodiments of the invention have been shown and described, many changes, modifications and substitutions may be made by one having ordinary skill in the art without necessarily departing from the spirit and scope of this invention.

We claim:

1. An apparatus for orienting articles which are moved along a path by a conveyor so that a work operation may be performed on the articles while the articles are oriented, said apparatus comprising:

a wheel having a peripheral surface, at least a portion of said peripheral surface being resiliently deformable;

means for mounting said wheel for rotation about a rotational axis which extends generally transverse to the direction of movement of the conveyor adjacent said wheel, said wheel being adapted to lie at least partially in the path of the articles conveyed to the wheel by the conveyor;

motor means for rotating said wheel about said rotational axis; and guide means adjacent said peripheral surface of said wheel for urging articles conveyed to the peripheral surface of said wheel against the peripheral surface to resiliently deform the peripheral surface sufficiently to capture the articles and hold the articles in a predetermined orientation whereby the articles are captured between the guide means and the wheel and held in a predetermined orientation during normal operation of the apparatus so that the work operation can be performed.

2. An apparatus as defined in claim 1 wherein said path adjacent said apparatus is generally horizontal and said rotational axis extends generally vertically.

3. An apparatus as defined in claim 2 wherein at least a portion of said peripheral surface is horizontally displaced from the conveyor and said wheel and said guide means cooperate to laterally remove the articles from the conveyor and to return the articles to the conveyor.

4. An apparatus as defined in claim 1 wherein said peripheral surface is curved and said guide means includes a curved rail adjacent said peripheral surface of said wheel, said articles being held in said predetermined orientation between said curved rail and the peripheral surface.

5. An apparatus as defined in claim 1 including article sensing means for providing a signal when one of the articles is captured by the wheel and the guide means and when such captured article reaches a predetermined position.

6. An apparatus as defined in claim 1 wherein said peripheral surface of said wheel is substantially cylindrical.

7. An apparatus for orienting articles which are moved past a work station so that a work operation can be performed on the articles while the articles are oriented, said apparatus comprising:

orienting means for guiding the articles along a predetermined path and for retaining said articles in a predetermined angular orientation as the articles are moved through said path, said path passing through a work station;

said orienting means including a wheel having a peripheral surface for engaging the articles on at least one side thereof, at least a portion of the peripheral surface of said wheel being resiliently deformable, and means for mounting said wheel for rotation about a rotational axis with the peripheral surface being movable along said path, said rotational axis extending generally transverse to the direction of movement of the articles along said path; and said orienting means including means cooperable with the wheel for engaging the articles on at least the other side thereof to urge the articles against the resilient deformable surface and into said resilient, deformable surface sufficiently to capture the articles and hold the articles in said predetermined orientation during normal operation of the apparatus as such articles move through the work station.

8. An apparatus as defined in claim 7 wherein said cooperable means includes a first curved rail and means for mounting the first rail for engagement with said other side of the articles.

9. An apparatus for performing a work operation on articles which are moved along a path by a conveyor, said apparatus comprising:

a wheel having a peripheral surface, at least a portion of said peripheral surface being resiliently deformable;

means for mounting said wheel for rotation about a rotational axis which extends generally transverse to the direction of movement of the conveyor adjacent said wheel, said wheel being adapted to lie at least partially in the path of the articles conveyed to the wheel by the conveyor;

motor means for rotating said wheel about said rotational axis;

guide means adjacent said peripheral surface of said wheel for urging articles conveyed to the peripheral surface of said wheel against the peripheral surface to resiliently deform the peripheral surface sufficiently to capture the articles and hold the articles in a predetermined orientation whereby the articles are captured between the guide means and the wheel and held in a predetermined orientation during normal operation of the apparatus; and means for performing a work operation on each of the articles when each of said articles is held in said predetermined orientation.

10. An apparatus as defined in claim 9 including article sensing means for providing a signal when one of the articles is captured by the wheel and the guide means and when such captured article reaches a predetermined position, and said performing means includes means responsive to said signal for performing said work operation on such captured article.

11. An apparatus as defined in claim 9 wherein at least a portion of said peripheral surface is horizontally displaced from the conveyor and said wheel and said guide means cooperate to laterally remove the articles from the conveyor and to return the articles to the conveyor, said performing means performs said work operation on the articles while such articles are removed from the conveyor.

12. An apparatus as defined in claim 9 wherein said article is a container and said performing means includes means for filling said container.

13. An apparatus as defined in claim 9 wherein the articles include containers having openings and said performing means includes means for closing the openings of the containers.

14. An apparatus as defined in claim 9 wherein the articles include containers and said performing means includes a container filling device, said container filling device including a plurality of filler assemblies, means for mounting said filler assemblies for movement along an endless path with at least a portion of said endless path extending along the path which the articles move along when they are captured between the guide means and the wheel, each of said filler assemblies includes a filler tube for depositing a material into at least one of the containers, sensing means for providing a signal when one of the containers is captured by the wheel and the guide means and when such captured container reaches a predetermined position and means responsive to each of said signals for causing one of the filler assemblies to move with a corresponding captured container to at least partially fill such corresponding captured containers with material while such containers are captured by the wheel and the guide means whereby the filling device can be used to at least partially fill randomly spaced containers.

15. An apparatus as defined in claim 10 wherein at least a portion of said peripheral surface is horizontally displaced from the conveyor and said wheel and said guide means cooperate to laterally remove the articles from the conveyor and to return the articles to the conveyor, said performing means performs said work operation on the articles while such articles are removed from the conveyor, said peripheral surface is curved and said guide means includes a curved rail adjacent said peripheral surface of said wheel, said articles being held in said predetermined orientation between said curved rail and the peripheral surface.

16. An apparatus for performing a work operation on articles which are moved past a work station, said apparatus comprising:
orienting means for guiding the articles along a predetermined path and for retaining said articles in a predetermined angular orientation as the articles are moved through said path, said path passing through the work station;
means for performing a work operation on the articles at the work station while such articles are held in said predetermined orientation;
said orienting means including first means for engaging the articles on at least one side thereof, said first means having a resilient, deformable surface and means for mounting said first means for movement along said path at the work station; and
said orienting means including means cooperable with the first means for engaging the articles on at least the other side thereof to urge the articles against the resilient deformable surface and into said resilient, deformable surface sufficiently to capture the articles and hold the articles in said predetermined orientation during normal operation of the apparatus as such articles move through the work station.

17. An apparatus as defined in claim 16 wherein said cooperable means includes a first curved rail and means for mounting the first rail for engagement with said other side of the articles, said apparatus including article sensing means for providing a signal when one of the articles is captured by said first means and said cooperable means and when said captured article reaches a predetermined position along said path, and said performing means includes means responsive to said signal for performing said work operation on such captured article.

18. An apparatus as defined in claim 16 wherein the articles are moved by a conveyor and said first means and said cooperable means removes the articles from the conveyor and returns the articles to the conveyor and said performing means performs said work operation on the articles while such articles are removed from the conveyor.

19. An apparatus as defined in claim 18 wherein the articles are moved laterally off the conveyor by said first means and said cooperable means, said apparatus includes a platform adjacent the conveyor at the location where the articles are moved laterally off the conveyor and the articles are moved over said platform.

20. An apparatus as defined in claim 16 wherein said cooperable means includes a first rail and means for mounting the first rail for engagement with said other side of the articles.

21. An apparatus as defined in claim 16 including article sensing means for providing a signal when one of the articles is captured by said first means and said cooperable means and when such captured article reaches a predetermined position along said path, and said performing means includes means responsive to said signal for performing the work operation on such captured article.

22. An apparatus as defined in claim 16 wherein said first means includes a wheel having a peripheral surface with at least a portion of the peripheral surface of said wheel being resiliently deformable, said mounting means includes means for mounting said wheel for rotation about a rotational axis which extends generally transverse to the direction of movement of the articles along said path.

* * * * *